United States Patent [19]
Sato

[11] 3,880,820
[45] Apr. 29, 1975

[54] METHOD FOR PRODUCING THERMOPLASTIC RESIN

[75] Inventor: Hisatake Sato, Yokohama, Japan

[73] Assignee: Nippon Oil Company, Limited, Tokyo, Japan

[22] Filed: Feb. 11, 1974

[21] Appl. No.: 441,134

[30] Foreign Application Priority Data
Feb. 15, 1973 Japan.............................. 48-18677

[52] U.S. Cl. .................... 260/82; 117/122; 161/167
[51] Int. Cl. ........................ C08f 15/04; C08f 15/42
[58] Field of Search ...................................... 260/82

[56] References Cited
UNITED STATES PATENTS

| | | | |
|---|---|---|---|
| 2,750,359 | 6/1956 | Hamner et al. ...................... | 260/82 |
| 2,773,051 | 12/1956 | Leary................................... | 260/82 |
| 3,709,854 | 1/1973 | Hepworth et al. ..................... | 260/82 |

Primary Examiner—Harry Wong, Jr.
Attorney, Agent, or Firm—Ostrolenk, Faber, Gerb & Soffen

[57] ABSTRACT

A method for producing a thermoplastic resin for adhesive base materials of pressure-sensitive adhesives and hot-melt adhesives, which comprises the steps of: heating a $C_5$ cracked petroleum oil fraction having a boiling point of 20° to 100°C at a temperature in the range of 100° to 300°C, whereby a Diels-Alder reaction occurs; separating the unreacted $C_5$ component from the resulting fraction, and polymerizing the resulting fraction in the presence of Friedel-Crafts catalyst. The invention is characterized in that the raw material for the resin can be obtained in a large quantity and at a low cost, and the obtained resin has excellent properties compared to the conventionally used terpene resin.

8 Claims, No Drawings

METHOD FOR PRODUCING THERMOPLASTIC RESIN

BACKGROUND OF THE INVENTION

This invention relates to a method for producing thermoplastic resins which have excellent properties as the adhesive base materials for pressure-sensitive adhesives and hot-melt adhesives.

More particularly, the invention relates to a method for producing such thermoplastic resins for adhesives having softening points of 90°C or higher which comprises the steps of heating a cracked petroleum oil fraction containing diolefins having 5 carbon atoms, and having a boiling point of 20° to 100°C, and polymerizing the thus obtained reaction mixture in the presence of Friedel-Crafts catalyst.

The terpene resins produced by polymerizing several turpentine oils which contain, as main components, α-pinene, β-pinene and dipentene, have been widely used as the base materials for pressure-sensitive adhesives and hot-melt adhesives because they give strong adhesive and cohesive properties, and have thermal and oxidation stability. There is, however, a limit to their supply as they are natural resourses, and in addition, the market prices are gradually raised because of the increasing demand.

BRIEF SUMMARY OF THE INVENTION

In view of the above, the principal object of the present invention is to propose a novel method for producing the adhesive base material used for pressure-sensitive adhesives and hot-melt adhesives from the petroleum fraction having 5 carbon atoms ($C_5$ fraction) which is obtainable at a low cost and in a large amount as the thermal cracking by-product of petroleum fractions in the petrochemical industry.

A further object of the present invention is to propose a method for producing the adhesive base material which is lightcolored, excellent in tackiness, adhesiveness and cohesiveness, and has superior thermal stability and oxidation stability properties.

Pursuant to the above objects, the present invention proposes a novel method for producing thermoplastic resin for adhesive base materials, which comprises the steps of heating said $C_5$ fraction having a boiling point of 20° to 100°C and containing diolefins at a temperature of 100° to 300°C, and polymerizing the thus obtained reaction mixture in the presence of Friedel-Crafts catalyst.

DETAILED DESCRIPTION OF THE INVENTION

The present invention will be further explained in detail in the following.

The $C_5$ fraction used in the method of the present invention is a by-product oil fraction having a boiling point of 20° to 100°C which is obtained in the process for producing ethylene, propylene, butenes and butadiene from light or heavy naphtha, kerosene, gas oil, fuel oil or crude oil through thermal cracking such as steam cracking, vapor phase thermal cracking and sand cracking, or catalytic cracking. Said $C_5$ fraction usually contains conjugated diolefins such as isoprene, piperylene and cyclopentadiene, other olefines such as isopentene, pentene-1 and pentene-2, and saturated hydrocarbons such as n-pentane and isopentane.

When the above-mentioned $C_5$ fraction which containing conjugated diolefins such as isoprene, piperylene and cyclopentadiene is heated, a mixture of several unsaturated cyclic and chain compounds is produced by Diels-Alder reaction. If the heating temperature is lower than 100°C, it is not practical because the rate of reaction is very low, while if the heating temperature is higher than 300°C, it is not desirable because a heavier component is produced. Accordingly, the heating temperature may be in the range of 100° to 300°C, and preferably from 150° to 250°C. After this thermal reaction, unreacted $C_5$ components are distilled off from the reaction mixture, and if desired, components heavier than the $C_5$-dimer may be removed also by distillation, while the thus obtained remainder fraction (hereinafter referred to as "$C_5$ thermal reaction mixture") can be used as the raw material for polymerization in the present invention. When a large amount of the component having more than 10 carbon atoms is contained in the $C_5$ thermal reaction mixture, the softening point of the resin produced therefrom is lowered, so that if a resin of a higher softening point is desired, the fraction heavier than the $C_5$-dimer may be preferably removed from the monomer.

This $C_5$ thermal reaction mixture contains a great variety of compounds and the strict composition can not be specified. However, generally speaking, 25 to 30 percent of several isoprene-piperylene copolymer, isoprene-olefin copolymer, piperylene-olefin copolymer, isoprene-cyclopentadiene copolymer, piperylene-cyclopentadiene copolymer and the respective polymers of isoprene, piperylene and cyclopentadiene are contained therein.

In the method of the present invention, the above-mentioned $C_5$ thermal reaction mixture is polymerized in the presence of Friedel-Crafts catalyst. This polymerization is carried out by adding a catalyst to the monomer with agitation, or by adding the monomer little by little to a catalyst solution (or slurry). This polymerization is exothermic so that the $C_5$ thermal reaction mixture is preferably cooled in advance. Further, the viscosity of the reaction mixture increases with the progress of polymerization and stirring becomes difficult, so that the polymerization may be carried out in a suitable solvent. When an aliphatic hydrocarbon such as hexane or heptane is used as the solvent, the yield and softening point of the obtained resin are low, which is not desirable. When a hydrocarbon halide such as methylene chloride or ethylene dichloride is used as the solvent, the yield of resin is good, however, there are some difficulties in that the treatment after the reaction is troublesome and the softening point of the resin becomes low. If an aromatic hydrocarbon is used as the solvent, the yield and softening point of the resin are high, and the color of the resin is light. Accordingly, it is considered that the aromatic hydrocarbons, especially benzene and toluene, are suitable as solvents for the polymerization.

In the polymerization, catalyst is added to the above-mentioned solvent to form a catalyst solution or catalyst slurry, and the $C_5$ thermal reaction mixture is then added to said solution or slurry, or the catalyst is added to a solution of said solvent and $C_5$ thermal reaction mixture. In practice, either of the above two methods may be employed.

The catalyst used in the method of the present invention comprises Friedel-Crafts type metal halides. Aluminum chloride, boron trifluoride, and ether-and phenol- complexes of them are especially suitable.

The catalyst concentration to the monomer is in the range of 0.1 to 10 percent by weight, and preferably 0.5 to 5 percent by weight. The polymerization temperature is in the range of 0° to 80°C, and preferably 20° to 60°C, and the polymerization period after the initiation is in the range of 30 minutes to 10 hours, and preferably 2 to 5 hours.

After the polymerization, aqueous alkali is added to the polymerization product to decompose the catalyst; water is then added to rinse the product, and the solvent; a small amount of unreacted material and lower polymers are removed by distillation, so that thereby a light yellow resin can be obtained in the bottom of the distillation column.

The thus obtained resin shows excellent properties as the adhesive base resin for pressure-sensitive adhesives and hot-melt adhesives, that is, the properties of adhesiveness, cohesiveness, thermal resistance, weather resistance and so forth of said resin are at least equal than those of the conventional terpene resin. Furthermore, the raw material of the resin according to the present invention can be supplied at a low cost and in a large quantity as the by-product of petrochemical industry. Accordingly, the practical value of the resin of the present invention is very large.

In order that those skilled in the art may better understand the present invention and the manner in which it may be practised, the following specific examples are given. It should be understood, however, that these are only illustrative and in no way restrictive of the invention.

EXAMPLE 1

The $C_5$ fraction having a boiling point of 25° to 60°C from the cracked oil fractions of steam cracking of naphtha had the composition shown in Table 1.

Table 1

| Composition of $C_5$ Fraction | | |
|---|---|---|
| Isopentane | 18.0 % | by weight |
| n-pentane | 28.0 | " |
| n-pentene-1 | 4.2 | " |
| 2-methylbutene-1 | 7.7 | " |
| Pentene-2 | 6.5 | " |
| 2-methylbutene-2 | 4.4 | " |
| 2-methylpentane | 0.5 | " |
| Cyclopentane | 1.1 | " |
| Isoprene | 15.1 | " |
| Cyclopentene | 3.8 | " |
| Piperylene | 9.8 | " |
| Cyclopentadiene | 0.3 | " |
| Unknown | 0.6 | " |

One kg of the fraction shown in Table 1 was fed into an autoclave with a stirrer, the contents were heated at 230°C for 30 minutes, and then unreacted $C_5$ fraction was removed by distillation. This distillation was continued to obtain 185 g of a fraction having a boiling point of 160° to 176°C.

To 300 ml four neck flask with a stirrer, a thermometer and a nitrogen inlet were added 10 g of anhydrous aluminum chloride and 50 g of toluene in the presence of nitrogen gas flow, and the above-mentioned fraction of 160° to 176°C in boiling point, which had been previously cooled, was added little by little to the flask with vigorous agitation. This addition was completed within 30 minutes, during which the solution temperature in the flask was kept at 20° to 25°C. After this addition, the polymerization was continued for a further two and a half hours at the same temperature. After the polymerization, 100 ml of 5 percent NaOH aqueous solution was added and stirred for 1 hour at 50°C, and then the polymerization product was rinsed three times with water in a separating funnel. Then the solvent, monomer and lower polymer were removed by reduced pressure distillation to obtain a light-yellow resin at a yield of 85 percent.

The properties of the thus obtained resin were as follows.

| | |
|---|---|
| Softening point (Ring and ball method) | 118°C |
| Color (Gardner) | 5 |
| Bromine value | 67 |

EXAMPLE 2

Using the same apparatus as employed in the foregoing Example 1, 5 g of anhydrous aluminum chloride and 100 g of benzene were added to the flask, and 100 g of the fraction of 160° to 176°C in boiling point as obtained in Example 1 was added with vigorous stirring within 15 minutes, during which the temperature in the flask was kept at 40° to 45°C. After this addition, the same procedure as Example 1 was carried out to obtain a light-yellow resin. The properties of the thus obtained resin were as follows.

| | |
|---|---|
| Softening point | 121°C |
| Color | 5 |
| Bromine value | 63 |

EXAMPLE 3

Using the same apparatus as those in Example 1, 100 g of the fraction of 160° to 176°C in boiling point as in Example 1 was fed into a flask, and 2.1 g of boron trifluoridediethylether was added therein little by little for 15 minutes, the temperature in the flask being kept at 20° to 25°C. After this addition, the same procedure as Example 1 was carried out to obtain a light-yellow resin. The properties of the thus obtained resin were as follows.

| | |
|---|---|
| Softening point | 115°C |
| Color | 5+ |
| Bromine value | 71 |

EXAMPLE 4

Adhesion tests with regard to the resins as prepared in the foregoing Examples were carried out, where β-pinene resin was also used as the control sample.

Composition:

| | | |
|---|---|---|
| Natural rubber ($ML_{1+4}$ (100°C) = 60) | 100 | parts by weight |
| Resin | 100 | " |
| Polybutene | 20 | " |
| Toluene | 800 | " |
| Antioxidant | 1 | " |

The above mixture was well dissolved by stirring at room temperature to prepare an adhesive.

Adhesion Tests:

A. Tackiness:

A layer of the above adhesive composition of 0.0254 cm (10 mil) in thickness was applied on a sheet of kraft paper, and allowed to stand for 24 hours at 23° to 24°C. Then, the tackiness was measured at 23°C according to J. Dow's rolling ball method.

B. Adhesiveness:

A layer of the above adhesive composition of 0.0254 cm in thickness was applied on a sheet of kraft paper, and allowed to stand for 23 to 24 hours, and then it was stuck on a stainless steel plate by using a sticking machine as shown in JIS (Japanese Industrial Standard) Z 1522. Thereafter, the force of peeling at 23°C from 180° direction was measured by pulling the test piece at 300 mm/min. with a Tensilon(Trade mark, Toyo Measuring Instruments Co., Ltd.) tensile testing machine.

C. Cohesiveness:

A test piece of 25 mm × 25 mm in size was formed in like manner as the above adhesiveness test, and was allowed to stand for 24 hours at 23° to 24°C. Then, a 1 kg load was applied to the test piece and the time until the load dropped was measured at 30°C.

Thermal Resistance Test:

The resin was kept at 200°C for 10 hours and Gardner color was measured.

The results of the above tests are shown in the following Table 2.

Table 2

| Resin | Softening Pt. (°C) | Color (Gardner) | Tackiness (Ball No.) | Adhesiveness (Kg/12.5cm) | Cohesiveness (hr.) | Thermal Resistance (Gardner) |
|---|---|---|---|---|---|---|
| Example 1 | 118 | 4+ | 21 | 1.19 | 8.5 | 9 |
| Example 3 | 115 | 4 | 23 | 0.93 | 9.1 | 9- |
| β-pinene Resin | 115 | 4 | 23 | 1.22 | 7.8 | 10 |

It will be understood from the above Table 2 that the resin produced according to the method of the present invention has excellent properties of adhesiveness, cohesiveness, thermal resistance and so forth.

What is claimed is:

1. A method for producing thermoplastic resins which have excellent properties as the adhesive base materials for pressure-sensitive adhesives and hot-melt adhesives which comprises the steps of:

heating a $C_5$ petroleum oil fraction, having a boiling point of 20°–100° C. and obtained by the thermal or catalytic cracking of petroleum, to a temperature in the range of 100°–300° C. whereby a Diels-Alder reaction occurs;

separating the unreacted $C_5$ component from the resulting fraction; and then polymerizing the resulting fraction in the presence of a Friedel-Crafts catalyst.

2. The method of claim 1 in which the temperature of the heating step is in the range of 150°–250° C. and the temperature of the polymerization step is in the range of 0°–80° C.

3. The method of claim 2 wherein the temperature of the polymerization step is 20°–60° C.

4. The method of claim 1 wherein the Friedel-Crafts catalyst is a metal halide.

5. The method of claim 4 wherein the metal halide is selected from the group consisting of aluminum chloride, boron trifluoride and complexes thereof.

6. The method of claim 1 wherein the polymerization step is carried out in the presence of an aromatic hydrocarbon solvent.

7. The method of claim 1 wherein the Friedel-Crafts catalyst concentration is 0.1–10 percent by weight.

8. The method of claim 1 wherein the unreacted $C_5$ component is removed by distillation.

* * * * *